United States Patent Office 3,578,688
Patented May 11, 1971

3,578,688
ISOMERIZATION OF ACIDS
Donald M. Fenton, Anaheim, Calif., assignor to Union
Oil Company of California, Los Angeles, Calif.
No Drawing. Filed May 3, 1968, Ser. No. 726,581
Int. Cl. C07c 3/14, 61/00, 53/00
U.S. Cl. 260—405.6                               18 Claims

ABSTRACT OF THE DISCLOSURE

A process for isomerization of carboxylic acids or anhydrides comprising contacting the acid or anhydride at elevated temperature in an essentially closed system with a complex catalyst comprising a Group VIII noble metal and a biphyllic ligand from the group consisting of organic phosphines, arsines and stibines, for a time sufficient to form an isomer of the acid or anhydride. The product acids and anhydrides are useful for preparation of a wide variety of products such as plasticizers, ester solvents, detergents, etc.

---

According to the present invention, it has been found that carboxylic acids or their anhydrides may be isomerized by contacting the acid or anhydride in an essentially closed system with a complex catalyst comprising a Group VIIII noble metal and a biphyllic ligand. The reaction is illustrated by the following equation:

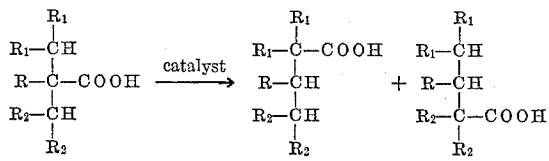

As can be seen from this equation, the isomerization reaction of the invention is characterized by migration of the acid function. The positions of the organic substituents on the molecule are not affected. The reaction may result in formation of a single isomer, or in a mixture of isomers as illustrated in the above equation, depending on the particular acid or anhydride reactant, the specific catalyst employed and the reaction conditions.

The acids that may be isomerized according to the process of the invention are saturated aliphatic or cycloaliphatic monocarboxylic acids having at least one beta hydrogen and having from 4 to about 20 or more carbon atoms. Examples are butyric, isobutyric, valeric, α-methylbutyric, caproic, α-methyl valeric, octanoic, lauric, palmitic, stearic, 3-methyl cyclohexane carboxylic, 4-ethyl cycloheptane carboxylic, etc., as well as isomeric forms of these and other acids falling within the scope of the generic class of the acids as described above.

The catalyst employed in the present invention comprises a complex of a Group VIII noble metal and a biphyllic ligand of phosphorus, arsenic or antimony. The complex can be formed prior to addition to the reaction medium, but is preferably formed in the reaction medium by charging thereto the ligand and the noble metal component.

The group VIII noble metal can be palladium, rhodium, ruthenium, platinum, osmium or iridium. While catalysts containing any of these metals may be used in the reaction, palladium-containing catalysts are preferred because of their greater activity, particularly at relatively mild reaction conditions.

A catalytic quantity of the Group VIII noble metal-containing catalyst is used. This is generally an amount sufficient to provide a concentration of the Group VIII noble metal which is between about 0.002 and about 2.0 weight percent of the liquid reaction medium and preferably between about 0.05 and about 0.5 weight percent. The Group VIII noble metal can be added to the reaction medium as the metal itself or as a soluble salt, a carbonyl compound or a chelate. Examples of suitable salts are the nitrates and halides of the metals such as palladium chloride, palladium nitrate, rhodium acetate, ruthenium bromide, osmium fluoride, palladium chloride, etc. Examples of suitable chelates are palladium acetyl acetonate and complexes of the platinum group metal ions with such conventional chelating agents as ethylenediamine tetraacetic acid and its alkali metal salts, citric acid, etc. The metal may be supported on an inert support such as carbon.

The biphyllic ligands comprise organic compounds having at least about 3 carbons and containing arsenic, antimony or phosphorus in a trivalent state. Of these, the phosphorus compounds, i.e., the phosphines, are preferred; however, the arsines and stibines can also be employed. In general these biphyllic ligands have the following structure:

$$E(R)_3$$

or the following structure:

$$(R)_2ER'E(R)_2$$

wherein E is a trivalent atom selected from the class consisting of phosphorus, arsenic and antimony; and wherein the R groups are selected from the class consisting of alkyl from 1 to 8 carbon atoms, aryl from 6 to 8 carbons and halo and alkoxy substitution products thereof; and
wherein R' is alkylene having from 1 to about 8 carbons.

In addition, ligands with the following general structure

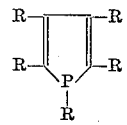

where R is hydrogen, alkyl or aryl may be used.

Examples of suitable biphyllic ligands having the aforementioned structures are the following: trimethyl phosphine, tri ethyl arsine, triisopropyl stibine, ethyldiisopropyl stibine, tricyclohexyl phosphine, triphenyl phosphine, tri(o-tolyl)phosphine, phenyl diisopropyl phosphine, phenyl diamyl phosphine, diphenylethyl phosphine, tris-panisyl phosphine, tris(diethylaminomethyl)phosphine, ethylene bis(diphenyl phosphine), hexamethylene bis(diisopropyl arsine), pentamethylene bis(diethylstibine), 1,2,5 - triphenylphosphol, etc. Of the aforementioned, the aryl phosphines are preferred because of their greater activity.

The reaction is performed under liquid phase conditions, and when the carboxylic acid or anhydride is a liquid at the reaction conditions it can be used in excess to provide the liquid reaction medium. If desired, however, any suitable organic liquid can be employed as a reaction solvent, preferably organic solvents which are inert to the reaction conditions, the reactant, the catalyst and the products. These include hydrocarbons such as the aromatics, aliphatics or alicyclic hydrocarbons, ethers, etc. Examples are naphthalene, o-dichlorobenzene, etc.

The reaction is performed under relatively mild conditions including temperatures from about 100 to about 300° C., preferably from about 150 to about 250° C. Sufficient pressure is used to maintain the reaction medium in liquid phase and to prevent volatilization of products. Suitable pressures will range from about 1 to 1000 atmospheres, with about 1 to 100 atmospheres being a preferred range. Optimum reaction time will vary with the reactant and the reaction conditions, i.e., temperature, pressure, etc., and is best determined experimentally.

The reaction may be carried out either in air or in an inert atmosphere. However, an inert atmosphere, such as nitrogen, is generally preferred to prevent possible undesirable side reaction. It has also been found that the isomerization is generally promoted by the presence of carbon monoxide. Consequently, it is generally preferable to maintain an atmosphere of about 50 to 400 p.s.i., preferably about 10 to 200 p.s.i., of CO in the reaction zone.

When the reactant is an acid best yields of isomers are obtained when a concentration of water of about zero to 20 percent, preferably about 1 to 10 percent, by weight is maintained in the reaction zone.

It has also been found that the reaction may be promoted by the presence of a reducing agent such as hydrogen or hydrazine. Liquid reducing agents are generally used in amounts of about 0.01 to 1 percent, perferably about 0.05 to 0.1 percent, by weight. Hydrogen pressures of about 10 to 400, preferably about to 50 to 100, p.s.i. can be used.

An essentially closed system, providing a suitable reaction environment, may be readily obtained by use of an autoclave, bomb, etc. as the reaction vessel. Products are separated from the reaction medium by conventional means such as distillation, precipitation or extraction.

The following examples will more specifically illustrate the practice of the invention.

EXAMPLE 1

A ½ gal. autoclave containing 1 g. $PdCl_2$, 5 g. triphenylphosphine and 400 ml. valeric acid was purged with nitrogen. Carbon monoxide was then added to 300 p.s.i. The mixture was stirred and heated to 200° C. for 4 hours. Gas chromatographic analysis showed the formation of some 20 g. of α-methylbutyric acid.

EXAMPLE 2

A ½ gal. autoclave containing ½ g. $PdCl_2$, 3 g. triphenylphosphine and 400 ml. isobutyric acid was purged with nitrogen. Carbon monoxide was then added to 400 p.s.i. The mixture was stirred and heated to 200° C. for 6 hours. Analysis showed the formation of 20 g. of n-butyric acid.

EXAMPLE 3

To ½ g. palladium chloride, 4 g. triphenylphosphine, 400 ml. valeric acid and 15 ml. water in a ½ gal. autoclave was added carbon monoxide to 400 p.s.i. The mixture was stirred and heated to 200° C. for 2 hours. The final pressure was 400 p.s.i. There was found 6 g. of α-methylbutyric acid.

EXAMPLE 4

To ½ g. palladium chloride, 3 g. triphenylphosphine, 400 ml. α-methylbutyric acid and 10 ml. water in a ½ gal. autoclave purged with nitrogen was added carbon monoxide to 300 p.s.i. The mixture was stirred and heated to 200° C. for 2 hours. The final pressure was 325 p.s.i. There was found 4 g. valeric acid.

EXAMPLE 5

To 50 ml. isobutyric anhydride, ½ g. palladium chloride and 3 g. triphenylphosphine in a 300 ml. titanium bomb purged with nitrogen was added carbon monoxide to 100 p.s.i. The mixture was rocked and heated to 200° C. for 6 hours. The final pressure was 200 p.s.i. There was found a mixture of acid and anhydrides corresponding to 20 g. isobutyric and 8 g. of butyric acid.

EXAMPLE 6

To 400 ml. valeric acid, 50 ml. acetic anhydride, 1 g. palladium chloride and 6 g. triphenylphosphine in a 1 gal. autoclave purged out with nitrogen was added nitrogen to 200 p.s.i. The mixture was stirred and heated to 200° C. for 2 hours. There was found 20 g. of α-methylbutyric acid.

EXAMPLE 7

To 400 ml. n-butyric acid, 1 g. palladium chloride, 4 g. triphenylphosphine and 10 ml. water in a ½ gal. autoclave twice purged with nitrogen was added carbon monoxide to 300 p.s.i. The mixture was stirred and heated to 220° C. for 2 hours. The final pressure was 300 p.s.i. There was found 4 g. isobutyric acid.

EXAMPLE 8

To 50 ml. butyric anhydride, 1 g. palladium chloride and 6 g. triphenylphosphine in a 300 ml. capacity steel bomb was added nitrogen to 100 p.s.i. The mixture was rocked and heated to 200° C. for 6 hours. The final pressure was 400 p.s.i. There was found 13 g. of isobutyric acid and 13 g. of n-butyric acid.

EXAMPLE 9

To ½ g. palladium bromide, 80 g. of a mixture of nonanoic and α-methyloctanoic acids in a 1.25 ratio, 3 g. triphenylphosphine, 400 ml. acetic acid and 50 ml. acetic anhydride in a ½ gal. autoclave purged with nitrogen was added nitrogen to 200 p.s.i. The mixture was stirred and heated to 200° C. for 2 hours. The final pressure was 225 p.s.i. The final ratio of nonanoic acid to α-methyl octanoic acid was 8 to 1.

EXAMPLE 10

To ½ g. palladium chloride, 3 g. of 1,2,5-triphenylphosphole, 350 ml. acetate acid, 80 g. of a mixture of nonanoic and α-methyloctanoic acids in a 1.25 ratio, and 50 m.l acetic anhydride in a ½ gal. autoclave purged with nitrogen was added nitrogen to 200 p.s.i. The mixture was stirred and heated to 200° C. for 2 hours. The final ratio of acids was 0.8.

EXAMPLE 11

To 80 g. of a mixture of nonanoic and α-methyloctanoic acids in a ratio of 1.25, 500 ml. acetic acid, 50 ml. acetic anhydride, 1½ g. palladium chloride bistriphenylphosphine, 3 g. triphenylphosphine and 5 ml. hydrazine hydrate in a 1 gal. autoclave purged out twice with nitrogen was added nitrogen to 200 p.s.i. The mixture was stirred and heated to 200° C. for 2 hours. The final pressure was 210 p.s.i. The final ratio of acids was 1.37.

EXAMPLE 12

To 80 g. of a mixture of nonanoic and α-methyloctanoic acids in a ratio of 1.25, 500 ml. acetic acid, 50 ml. acetic anhydride, ½ g. palladium chloride and 4 g. triphenylphosphine in a 1 gal. autoclave twice purged with nitrogen was added hydrogen to 200 p.s.i. The mixture was stirred and heated to 200° C. for 2 hours. The final ratio of acids was 1.32.

I claim:

1. A process for isomerization of a $C_4$ to $C_{20}$ saturated aliphatic or cycloaliphatic monocarboxylic acids or the corresponding anhydride having at least one isomer and one beta hydrogen which comprises contacting the acid or anhydride at a temperature of from about 100 to about 300° C. and at a sufficient pressure to maintain liquid phase conditions with a complex catalyst comprising a Group VIII noble metal in complex association with at least one biphyllic ligand having at least three carbon atoms and having the following formula:

or

wherein:

E is a trivalent atom selected from the group consisting of phosphorus, arsenic and antimony;
the R groups represent an alkyl having from 1 to 8 carbon atoms, an aryl having from 6 to 8 carbons or the halo or alkoxy substitution product thereof; and R' is an alkylene having from 1 to about 8 carbon atoms;

said contacting being for a time sufficient to form an isomer of the acid or anhydride.

2. The process of claim 1 in which the acid is butyric acid.

3. The process of claim 1 in which the acid is valeric acid.

4. The process of claim 1 in which the acid is isobutyric acid.

5. The process of claim 1 in which the acid is α-methylbutyric acid.

6. The process of claim 1 in which the acid is nonanoic acid.

7. The process of claim 1 in which the acid is α-methyloctanoic.

8. The process of claim 1 in which the anhydride is butyric anhydride.

9. The process of claim 1 in which the anhydride is isobutyric anhydride.

10. The process of claim 1 in which the Group VIII noble metal is palladium.

11. The process of cliam 1 in which the biphyllic ligand is a triaryl phosphine.

12. The process of claim 11 in which the phosphine is triphenyl phosphine.

13. The process of claim 1 in which the reaction temperature is from about 100 to 300° C. and the pressure is from about 1 to 100 atmospheres.

14. The process of claim 1 in which the reaction is carried out in an atmosphere of about 100 to 200 p.s.i. of carbon monoxide.

15. The process of claim 1 in which the reaction is carried out in the presence of water.

16. The process of claim 1 in which the reaction is carried out in the presence of a reducing agent.

17. The process of claim 1 in which the reaction is carried out in an organic solvent.

18. A process for isomerization of a $C_4$ to $C_9$ saturated aliphatic monocarboxylic acid having at least one beta hydrogen or the corresponding anhydride thereof comprising contacting the acid or anhydride at a temperature of about 100 to 300° C. and at a pressure sufficient to maintain liquid phase conditions with a complex catalyst comprising palladium in complex association with triphenylphosphine, said contacting being for a time sufficient to form an isomer of the acid or anhydride.

References Cited

Bailar, Jr., et al., "Homogeneous Catalysis in the Reactions of Olefinic Substances VI Selective Hydrogenation of Methyl Linoleate and Isomerization of Methyl Oleate by Homogeneous Catalysis with Platinum Complexes Containing Triphenylphosphine, etc." Chem. Abs., vol. 67, 2664b (1967).

LEWIS GOTTS, Primary Examiner

C. L. MILLS, Assistant Examiner

U.S. Cl. X.R.

260—514, 526, 546